US008848857B2

(12) United States Patent  
Togasawa et al.

(10) Patent No.: US 8,848,857 B2  
(45) Date of Patent: Sep. 30, 2014

(54) PREVENTIVE MAINTENANCE/REPAIR DEVICE AND PREVENTIVE MAINENANCE/REPAIR METHOD FOR CYLINDRICAL STRUCTURE

(71) Applicant: Kabushiki Kaisha Toshiba, Tokyo (JP)

(72) Inventors: Yutaka Togasawa, Yokohama (JP); Mitsuaki Shimamura, Saitama (JP); Hisashi Hozumi, Tokyo (JP); Yasuhiro Yuguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 13/759,580

(22) Filed: Feb. 5, 2013

(65) Prior Publication Data

US 2013/0170597 A1     Jul. 4, 2013

Related U.S. Application Data

(62) Division of application No. 12/600,774, filed as application No. PCT/JP2008/059449 on May 22, 2008, now abandoned.

(30) Foreign Application Priority Data

May 22, 2007    (JP) ................................. 2007-135302

(51) Int. Cl.
*G21C 3/56*      (2006.01)
*G21C 17/017*    (2006.01)
*G21C 19/20*     (2006.01)

(52) U.S. Cl.
CPC ......... *G21C 19/207* (2013.01); *G21Y 2004/504* (2013.01); *G21Y 2002/402* (2013.01); *G21C 17/017* (2013.01); *G21Y 2002/401* (2013.01); *G21Y 2004/501* (2013.01); *G21Y 2002/304* (2013.01)
USPC ....................................... 376/392

(58) Field of Classification Search
CPC ............... G21C 19/207; G21C 17/017; G21Y 2004/504; G21Y 2004/501; G21Y 2002/401; G21Y 2002/402; G21Y 2002/304
USPC .................................................. 342/260, 261
See application file for complete search history.

(56) References Cited

U.S. PATENT DOCUMENTS 4,781,882 A    11/1988   Salton et al.
6,526,114 B2    2/2003   Paillaman et al.
(Continued)

FOREIGN PATENT DOCUMENTS

JP       05-209864 A    8/1993
JP       10-273095 A   10/1998
(Continued)

OTHER PUBLICATIONS

Taiwanese Office Action with English Translation, dated Feb. 22, 2013, 6 pages.

(Continued)

*Primary Examiner* — Frank J McGue  
(74) *Attorney, Agent, or Firm* — Foley & Lardner LLP

(57) ABSTRACT

A preventive maintenance/repair device 10 of the present invention includes: a device body 11, and holding mechanisms 13a and 13b connected to the device body 11, the holding mechanisms 13a and 13b being configured to hold the device body 11 on an outer circumferential surface of a cylindrical structure 19. Further, the device body 11 is equipped with a traveling and driving part configured to be circumferentially movable along the outer circumferential surface of the cylindrical structure 19. Furthermore, each of the holding mechanisms 13a and 13b is equipped with a maintenance/repair mechanism 16 configured to maintain and repair the cylindrical structure 19.

11 Claims, 10 Drawing Sheets

(56) References Cited

U.S. PATENT DOCUMENTS

| | | |
|---|---|---|
| 2002/0080905 A1 | 6/2002 | Paillaman et al. |
| 2008/0310923 A1 * | 12/2008 | Jinnings et al. ............... 405/232 |

FOREIGN PATENT DOCUMENTS

| | | | |
|---|---|---|---|
| JP | 11-109081 A | | 4/1999 |
| JP | 11-174192 A | | 7/1999 |
| JP | 3011583 B2 | | 12/1999 |
| JP | 3069005 B2 | | 5/2000 |
| JP | 3075952 B2 | | 6/2000 |
| JP | 2001-065778 A | | 3/2001 |
| JP | 2001-147287 | * | 5/2001 |
| JP | 2001-147287 A | | 5/2001 |
| JP | 2002-148385 A | | 5/2002 |
| JP | 3288924 B2 | | 6/2002 |
| JP | 2002-311183 A | | 10/2002 |
| JP | 2003-185784 A | | 7/2003 |
| JP | 2004-251894 A | | 9/2004 |
| JP | 2004-317236 | * | 11/2004 |
| JP | 2004-317236 A | | 11/2004 |
| JP | 2005-188954 A | | 7/2005 |
| JP | 2005-337917 A | | 12/2005 |
| WO | WO 00/45393 A2 | | 8/2000 |

OTHER PUBLICATIONS

Japanese Office Action and English Translation, dated Feb. 25, 2011, 5 pages.

* cited by examiner

PREVENTIVE MAINTENANCE/REPAIR DEVICE AND PREVENTIVE MAINENANCE/REPAIR METHOD FOR CYLINDRICAL STRUCTURE

CROSS-REFERENCE TO RELATED APPLICATIONS

This application is a divisional of Ser. No. 12/600,774 filed on Nov. 18, 2009, which is a national stage application of International Application No. PCT/JP2008/059449 filed on May 22, 2008, which is based upon and claims the benefit of priority from Japanese Patent Application No. 2007-135302 filed on May 22, 2007; the entire contents of all of which are incorporated herein by reference.

FIELD OF THE INVENTION

The present invention relates to a preventive maintenance/repair device and a preventive maintenance/repair method for a cylindrical structure of a cylindrical shape among reactor internal structures installed in a reactor pressure vessel.

BACKGROUND ART

Generally, a reactor internal structure installed in a reactor pressure vessel 1 is formed of a material having an excellent corrosion resistance and a mechanical strength under a high temperature and a high pressure environment, such as an austenitic stainless steel and a nickel based alloy. However, even a reactor internal structure formed of such a material may suffer from a material deterioration which is caused by a lengthy operation under a high temperature and a high pressure environment and by an irradiation of neutron. In particular, in a portion near a welding part of the reactor internal structure, when a heat is generated upon welding, a material of the portion may be sensitized or a tensile residual stress may be generated so that a stress corrosion cracking may possibly occur. In this case, it is difficult to change the reactor internal structure for another, which poses a serious problem in terms of maintenance and administration.

An overall structure of the reactor internal structure installed in the reactor pressure vessel 1 in a boiling water reactor electric-power plant (hereinafter referred to as "BWR plant") is described with reference to FIG. 9. A shroud 2 supporting a fuel assembly is disposed inside the reactor pressure vessel 1. A jet pump 3 is disposed on a part (annulus part) between an inner wall of the reactor pressure vessel 1 and the shroud 2. In addition, disposed on a lower part of the reactor pressure vessel 1 is a control-rod drive mechanism housing 4, and disposed on an upper part of the reactor pressure vessel 1 is a core spray pipe 48 (hereinafter referred to as "CS pipe").

As shown in FIG. 10, the jet pump 3 includes: a riser pipe 8 located on a side where a coolant is taken in; a mixer nozzle 7 located above the riser pipe 8 and connected to an upper end of the riser pipe 8; and an inlet mixer 5 connected to a lower end of the mixer nozzle 7. A diffuser 6 is connected to a lower end of the inlet mixer 5. In order to support the riser pipe 8 on the inner wall of the reactor pressure vessel 1, a riser brace 9 is mounted on the inner wall of the reactor pressure vessel 1.

Various maintenance/repair devices have been proposed for maintaining and repairing such a reactor internal structure.

At first, there is described a case in which an outer surface of the jet pump 3 is maintained and repaired. In this case, a maintenance/repair device is firstly fitted onto a distal end of a cable or a distal end of an articulated operation pole, and the maintenance/repair device is sent into the reaction pressure vessel 1 from the upper part thereof in a hanging manner. Then, the maintenance/repair device is fixed on a reactor internal structure above the jet pump 3 or the riser brace 9. Thereafter, a target region is subjected to a maintaining and repairing operation by the maintenance/repair device. Such a maintenance/repair device is disclosed in JP11-109081A and JP2002-148385A.

Next, there is described a case in which an inner surface of the jet pump 3 is maintained and repaired. In this case, the inlet mixer 5 is firstly removed. Then, the maintenance/repair device is sent into the reaction pressure vessel 1 from the upper part thereof in a hanging manner. Then, the maintenance/repair device is inserted into the jet pump 3. Thereafter, a target region is subjected to a maintaining and repairing operation by the maintenance/repair device. In an alternative method, the maintenance/repair device is inserted into the diffuser 6 from the lower part of the reaction pressure vessel 1, and a target region is subjected to a maintaining and repairing operation. Such a maintenance/repair device is disclosed in JP5-209864A and JP2003-185784A.

Next, there is described a case in which the inner surface of the jet pump 3 is maintained and repaired without removing the inlet mixer 5. In this case, the maintenance/repair device is inserted into a gap formed in an opening of the mixer nozzle 7, and a target region is subjected to a maintaining and repairing operation. Such a maintenance/repair device is disclosed in JP2001-65778A, JP2002-311183A, and JP2004-251894A.

However, the aforementioned maintenance/repair devices are intended to maintain and repair the diffuser 6 which is a part of the jet pump 3, and thus cannot maintain and repair the inside and the outside of the riser pipe 8.

Next, there is described a case in which a wall of the shroud 2 is maintained and repaired. In this case, a maintenance/repair device is inserted into the annulus part from the upper part of the reactor pressure vessel 1. Alternatively, the maintenance/repair device is inserted from the upper part of the reactor pressure vessel 1 through an upper lattice plate 47 disposed above the shroud 2. Thereafter, a target region is subjected to a maintaining and repairing operation by the maintenance/repair device. Such maintenance/repair device are disclosed in JP Patent Nos. 3288924, 3075952, and 3069005, and JP11-174192A. However, the maintenance/repair devices are intended to maintain and repair the wall of the shroud 2, and thus cannot maintain and repair another reactor internal structure in the reactor pressure vessel 1, in particular, a cylindrical structure such as a pipe.

Next, there is described a case in which a bottom part of the reactor pressure vessel 1 is maintained and repaired. Such maintenance/repair devices are disclosed in JP2002-651159A and JP Patent No. 3011583. Although these maintenance/repair devices are advantageous in their small dimensions and free movableness in water, the maintenance/repair devices cannot maintain and repair the outer surface and the inner surface of the jet pump 3, because the space of the annulus part is further narrower.

Almost all the above-described maintenance/repair devices are sent into the reactor pressure vessel 1 from the upper part thereof through a cable or a wire in a hanging manner, and are brought closer to a cylindrical structure such as a pipe installed in the reactor pressure vessel 1 so as to be fixed onto the outer surface of the cylindrical structure. When the maintenance/repair device is fixed onto the inner surface of the cylindrical structure, a plurality of arms of the maintenance/repair device are expanded in a radial direction of the inner surface of the cylindrical structure. Thus, the plurality of arms are pressed onto the inner surface of the cylindrical structure, whereby the maintenance/repair device can be fixed thereon.

When the aforementioned maintenance/repair device is fixed onto the outer surface of the cylindrical structure, since there are various cylindrical structures of different shapes and different dimensions, it is necessary to change the structure or the configuration of the maintenance/repair device in accordance with a target region to be maintained and repaired. Thus, the structure of the maintenance/repair device is complicated, and the size of the maintenance/repair device is further enlarged.

DISCLOSURE OF THE INVENTION

The present invention has been made in view of the above circumstances. The object of the present invention is to provide: a preventive maintenance/repair device that is capable of precisely, circumferentially moving along an outer circumferential surface of a cylindrical structure of a cylindrical shape among reactor internal structures installed in a reactor pressure vessel, and of being securely held on the outer circumferential surface of the cylindrical structure, so as to maintain and repair the cylindrical structure; and a preventive maintenance/repair method thereof.

The present invention is a preventive maintenance/repair device for use in maintaining and repairing a cylindrical structure of a cylindrical shape among reactor internal structures installed in a reactor pressure vessel, the preventive maintenance/repair device comprising: a device body; a holding mechanism connected to the device body, the holding mechanism being configured to hold the device body on an outer circumferential surface of the cylindrical structure; a traveling and driving part disposed on the device body, the traveling and driving part being configured to be circumferentially movable along the outer circumferential surface of the cylindrical structure; and a maintenance/repair mechanism disposed on the holding mechanism, the maintenance/repair mechanism being configured to maintain and repair the cylindrical structure.

The present invention is the preventive maintenance/repair device wherein the holding mechanism includes: a pair of arms each having a shape along the outer circumferential surface of the cylindrical structure; guide rollers respectively disposed on distal ends of the pair of arms; arm cylinders configured to respectively drive the pair of arms; and links connected between the arms and the arm cylinders, the links being configured to transmit drives of the arm cylinders to the arms.

The present invention is the preventive maintenance/repair device wherein each of the arms of the holding mechanism is separable into a proximal arm body and a distal arm end, and in order to hold the device body on an outer circumferential surface of another cylindrical structure of a different outer diameter, the arm end can be replaced with another arm end of a different length with respect to the arm body.

The present invention is the preventive maintenance/repair device wherein each of the arms of the holding mechanism is separable into a proximal arm body and a distal arm end, and in order to hold the device body on an outer circumferential surface of another cylindrical structure of a different outer diameter, the arm body can be replaced with another arm body of a different length with respect to the device body.

The present invention is the preventive maintenance/repair device wherein a distance sensor is disposed on an outer surface of the device body on a side opposed to a surrounding structure.

The present invention is the preventive maintenance/repair device wherein a distance sensor is disposed on an outer surface of the device body on a side opposed to a surrounding structure.

The present invention is the preventive maintenance/repair device wherein the maintenance/repair mechanism includes an equipment configured to maintain and repair the cylindrical structure, and an equipment cylinder configured to drive the equipment in a longitudinal direction of the cylindrical structure.

The present invention is the preventive maintenance/repair device wherein the equipment of the maintenance/repair mechanism is formed of an ultrasonic flaw-detecting probe.

The present invention is the preventive maintenance/repair device wherein the equipment of the maintenance/repair mechanism is a camera for a visual observation.

The present invention is the preventive maintenance/repair device wherein the equipment of the maintenance/repair mechanism is a polishing jig.

The present invention is the preventive maintenance/repair device wherein the device body is provided with an access device configured to bring the device body closer to the cylindrical structure so as to attach the device body to the outer circumferential surface of the cylindrical structure and to detach therefrom the device body, and an operation pole is connected to the access device, The present invention is the preventive maintenance/repair device wherein the access device includes: an access-device holding part engageable with the device body; and a rotating and driving part interposed between the operation pole and the access-device holding part, the rotating and driving part being configured to rotate the device body and the access-device holding part with respect to the operation pole.

The present invention is a preventive maintenance/repair device for use in maintaining and repairing a cylindrical structure of a cylindrical shape among reactor internal structures installed in a reactor pressure vessel, the preventive maintenance/repair device comprising: a device body; a holding mechanism connected to the device body, the holding mechanism being configured to hold the device body on an outer circumferential surface of the cylindrical structure; a traveling and driving part disposed on the device body, the traveling and driving part being configured to be circumferentially movable along the outer circumferential surface of the cylindrical structure; and a maintenance/repair mechanism disposed on the device body, the maintenance/repair mechanism being configured to maintain and repair the cylindrical structure; wherein the device body is provided with a thruster driving part configured to move the device body in water.

The present invention is the preventive maintenance/repair device wherein a buoyant member is located in one of the device body and the maintenance/repair mechanism.

The present invention is a preventive maintenance/repair method comprising the steps of: mounting the access device and the operation pole on the device body; sending the device body into the reactor pressure vessel in a hanging manner through the operation pole and bringing the device body closer to the cylindrical structure; holding the device body on the outer circumferential surface of the cylindrical body by the holding mechanism; removing the access device from the device body, after the device body has been held on the cylindrical structure by the holding mechanism; and performing a maintenance/repair operation to the cylindrical structure by the maintenance/repair mechanism.

According to the present invention, the preventive maintenance/repair device can be securely held on the outer circumferential surface of the cylindrical structure in the reactor pressure vessel. In addition, the maintenance/repair device can be circumferentially moved on the outer circumferential surface of the cylindrical structure. Thus, the maintenance/repair device can be precisely moved to a target region of the outer circumferential surface of the cylindrical structure, so that the outer circumferential surface of the cylindrical structure can be maintained and repaired.

According to the present invention, the preventive maintenance/repair device can be securely held on the outer circumferential surface of the cylindrical structure in the reactor pressure vessel. In addition, the maintenance/repair device can be circumferentially moved on the outer circumferential surface of the cylindrical structure. In addition, the maintenance/repair device can be moved in water. Thus, the maintenance/repair device can be precisely moved to a target region of the outer circumferential surface of the cylindrical structure, so that the outer circumferential surface of the cylindrical structure can be maintained and repaired.

BEST MODE FOR CARRYING OUT THE INVENTION

First Embodiment

Figure 1:
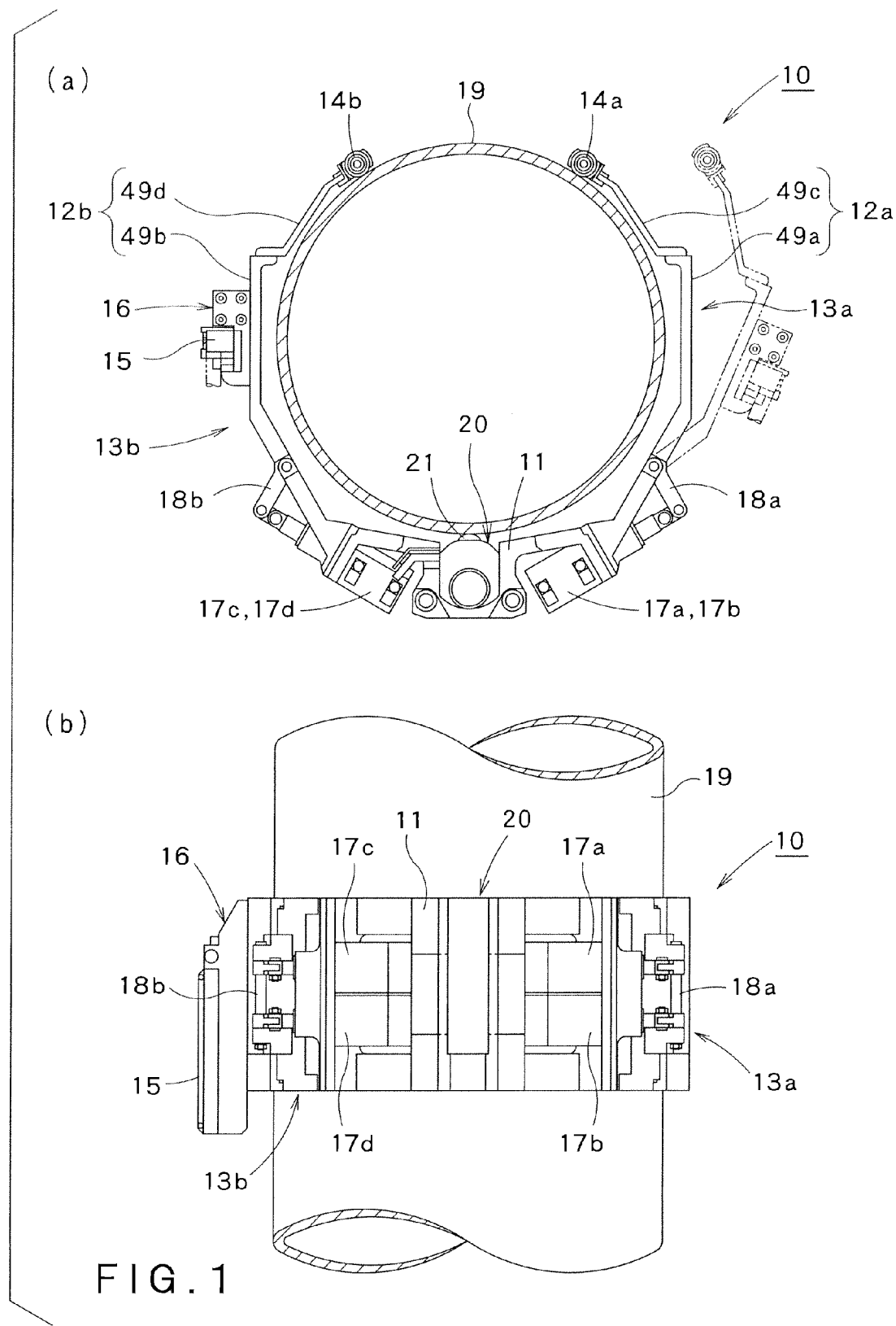
FIG. 1 is an overall structural view for explaining a preventive maintenance/repair device in a first embodiment of the present invention.
Figure 2:
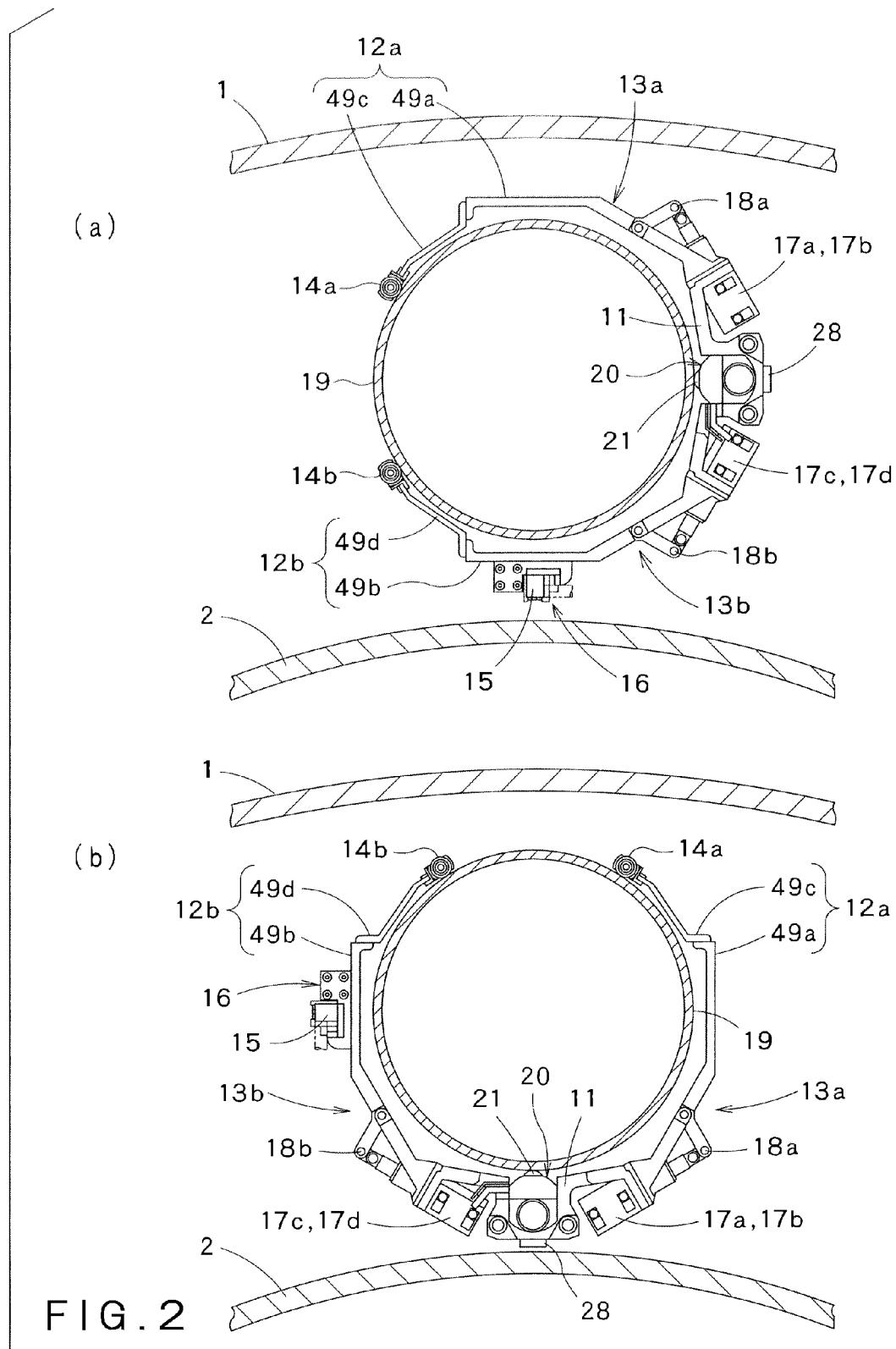
FIG. 2 is a view for explaining a method of determining an initial holding position at which the preventive maintenance/repair device in the first embodiment of the present invention is held.
Figure 3:
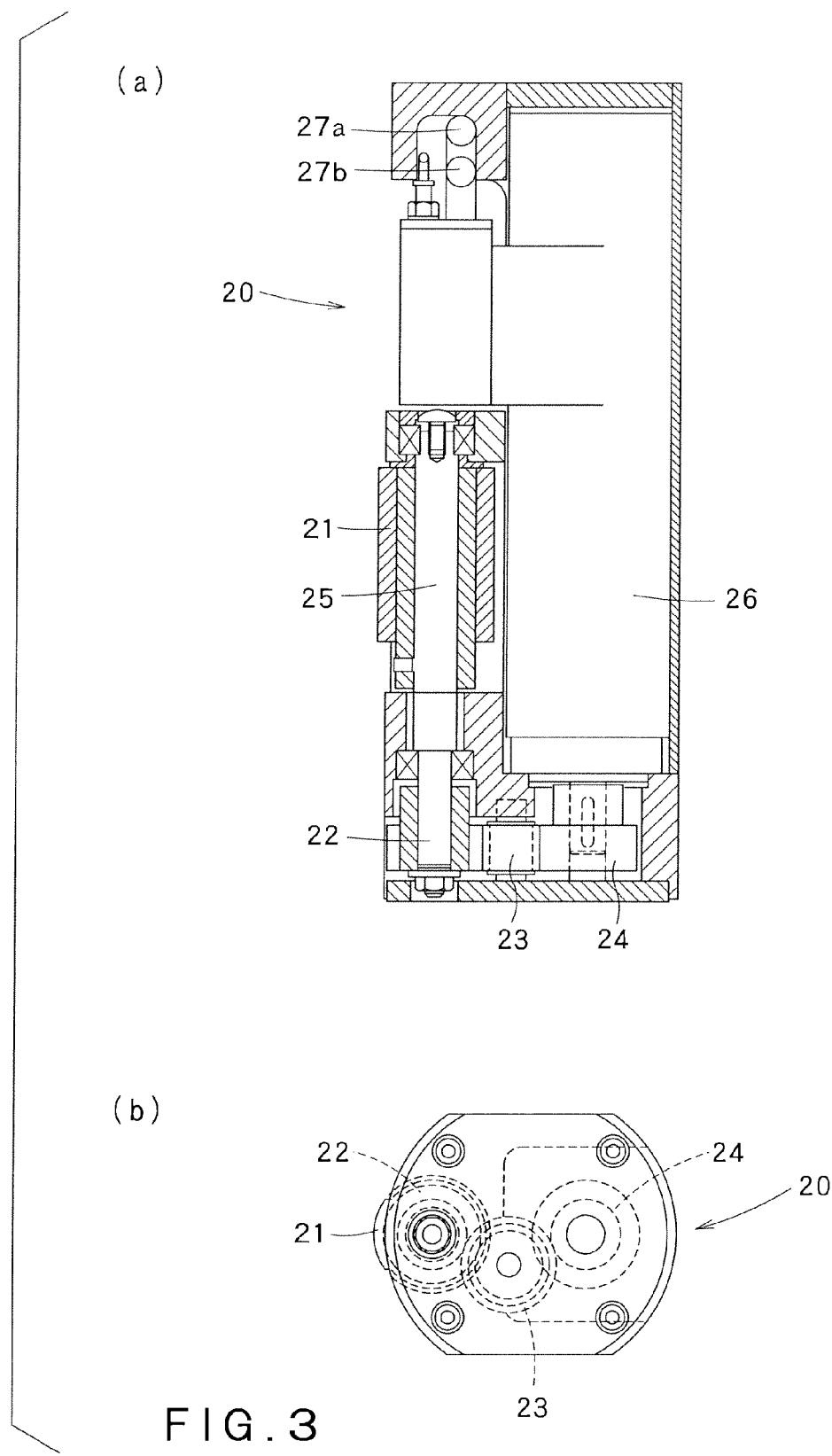
FIG. 3 is a structural view for explaining a traveling and driving part in the first embodiment of the present invention.
Figure 4:
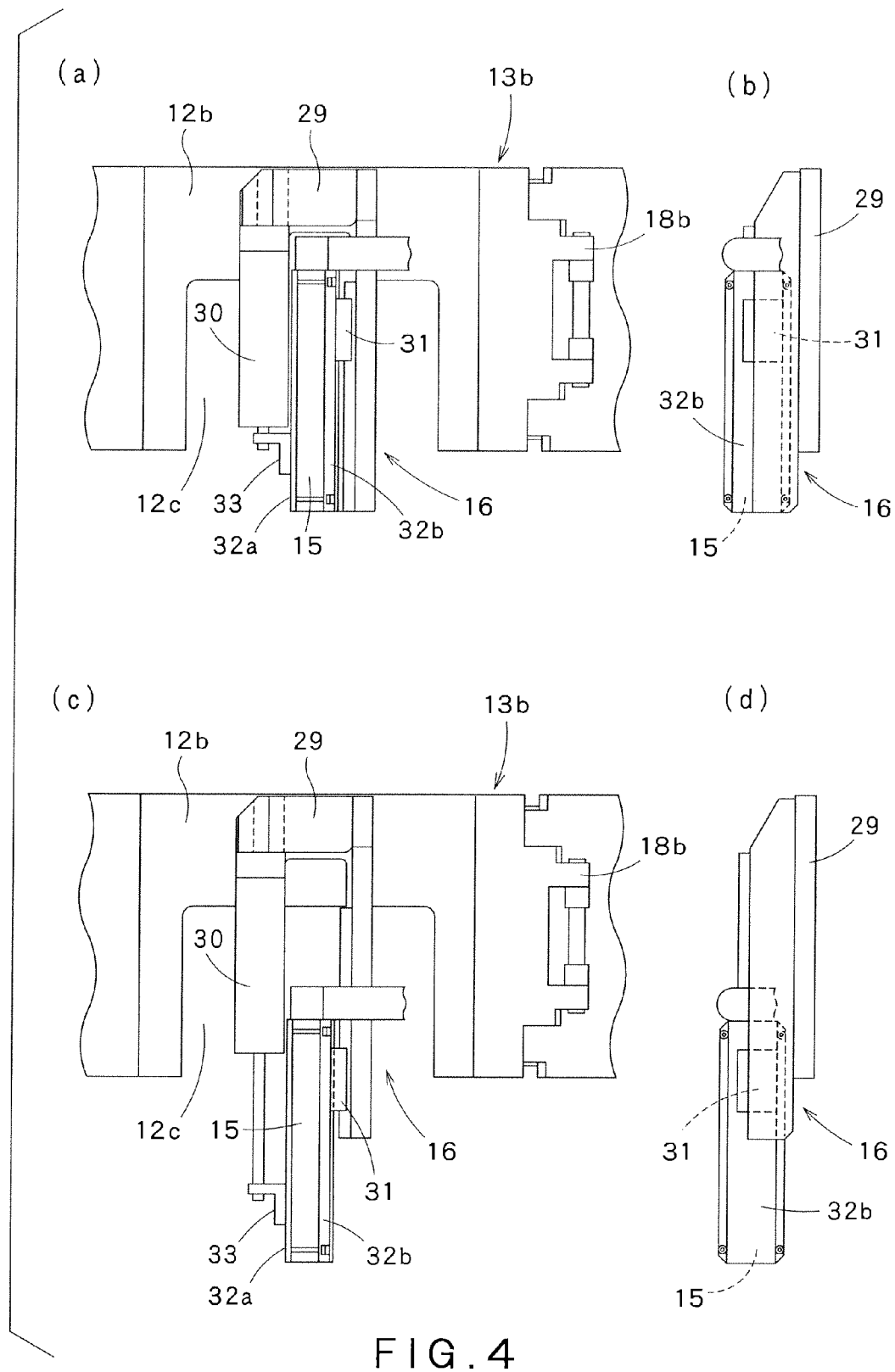
FIG. 4 is a structural view for explaining a maintenance/repair mechanism in the first embodiment of the present invention.
Figure 5:
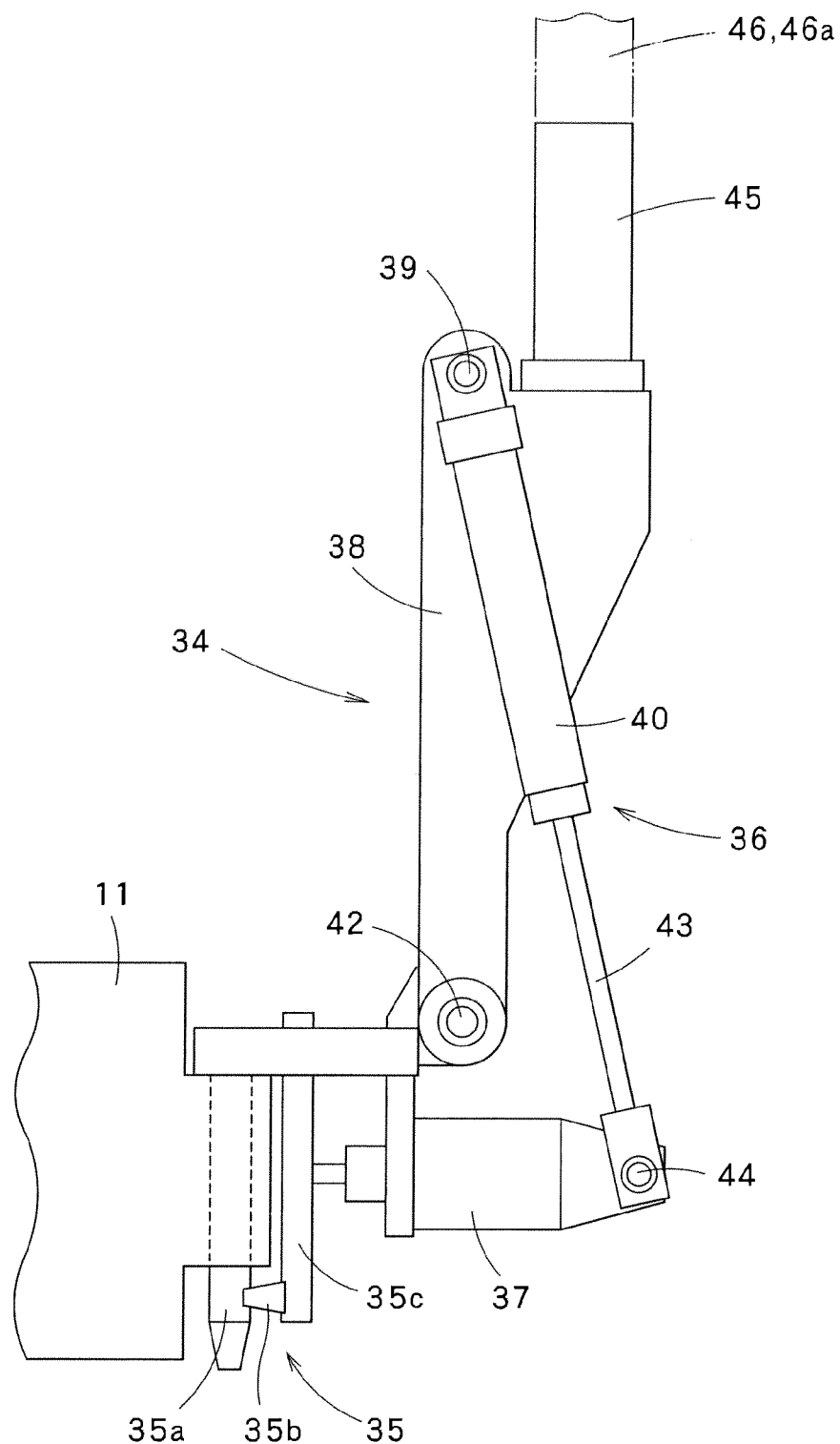
FIG. 5 is a structural view for explaining an access device in the first embodiment of the present invention.
Figure 6:
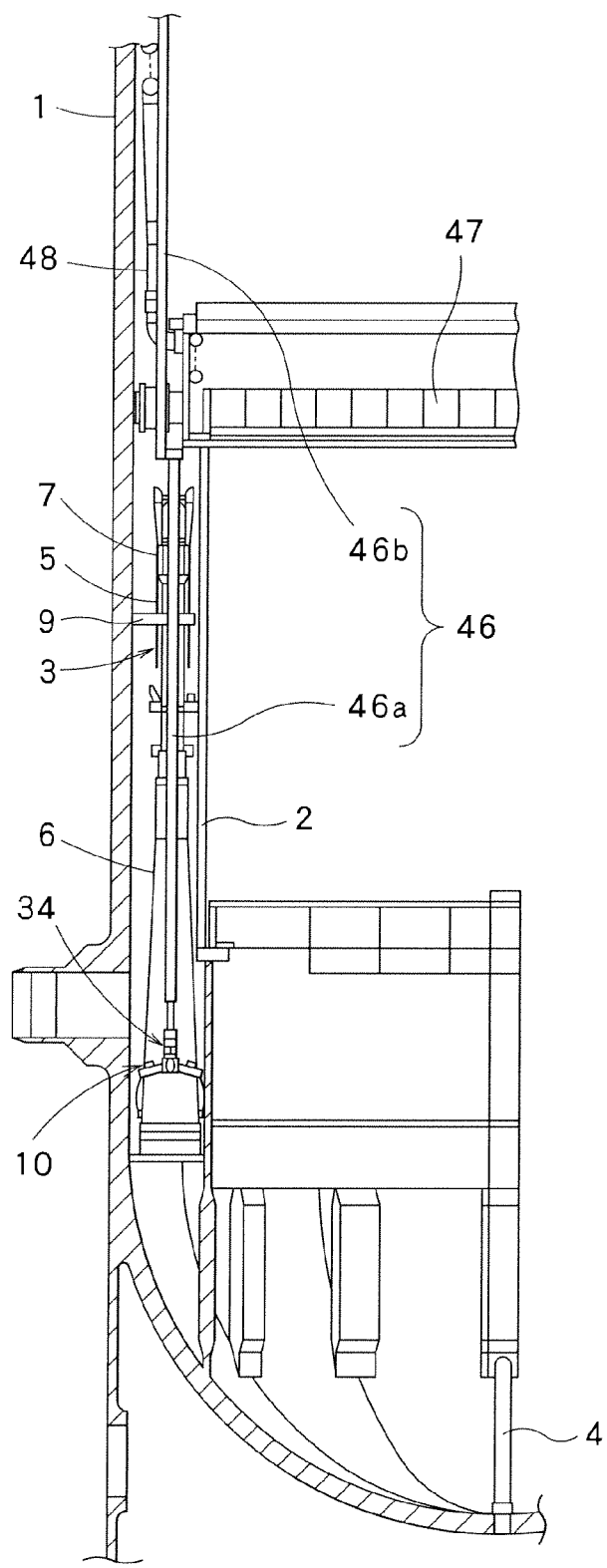
FIG. 6 is a view for explaining the connection of an operation pole to the access device in the first embodiment of the present invention.

Embodiments of the present invention will be described herebelow with reference to the accompanying drawings. FIGS. 1 to 6 show a preventive maintenance/repair device in a first embodiment of the present invention. FIGS. 1(a) and 1(b) are overall structural views for explaining the preventive maintenance/repair device. FIGS. 2(a) and 2(b) are views for explaining a method of determining an initial holding position at which the preventive maintenance/repair device is held. FIGS. 3(a) and 3(b) are structural views for explaining a traveling and driving part. FIGS. 4(a), 4(b), 4(c), and 4(d) are structural views for explaining a maintenance/repair mechanism. FIG. 5 is a view for explaining an access device. FIG. 6 is a view for explaining the connection of an operation pole to the access device.

At first, a preventive maintenance/repair device 10 in the first embodiment of the present invention is described with reference to FIGS. 1(a) and 1(b). FIG. 1(a) is a plan view of the overall structure for explaining the preventive maintenance/repair device 10, and FIG. 1(b) is a front view of the overall structure for explaining the preventive maintenance/repair device 10. The preventive maintenance/repair device 10 in this embodiment is a device for cleaning, checking, inspecting, maintaining, and repairing an outer surface of a cylindrical structure 19 of a cylindrical shape such as a pipe among reactor internal structures installed in a reactor pressure vessel 1 in a BWR plant. In particular, target regions are welding portions of a jet pump 3, a core spray pipe 48 (hereinafter referred to as "CS pipe"), and a control-rod drive mechanism housing 4 (hereinafter referred to as "CRD housing"), which are generically referred to as a cylindrical structure 19 installed in the reactor pressure vessel 1.

At first, the overall structure of the preventive maintenance/repair device 10 in this embodiment is described with reference to FIGS. 1(a) and 1(b). The preventive maintenance/repair device 10 includes: a device body 11; a pair of holding mechanisms 13a and 13b connected to the device body 11, the holding mechanism 13a and 13b being capable of holding the device body 11 on an outer circumferential surface of the cylindrical structure 19; and a traveling and driving part 20 disposed on the device body 11, the traveling and driving part 20 being capable of circumferentially moving along the outer circumferential surface of the cylindrical structure 19. Each of the holding mechanisms 13a and 13b is provided with a maintenance/repair mechanism 16 that maintains and repairs the cylindrical structure 19.

The pair of holding mechanisms 13a and 13b respectively include: a pair of arms 12a and 12b each having a shape along the outer circumferential surface of the cylindrical structure 19; and guide rollers 14a and 14b disposed on distal ends of the pair of arms 12a and 12b. Respectively connected to the pair of arms 12a and 12b are arm cylinders 17a and 17b and arm cylinders 17c and 17d for driving the arms 12a and 12b pneumatically or hydraulically. The arm 12a and the arm cylinders 17a and 17b are connected by a link 18a, and the arm 12b and the arm cylinders 17c and 17d are connected by a link 8b, the links 18a and 18b being configured to transmit the driving force of the arm cylinders 17a and 17b and the driving force of the arm cylinders 17c and 17d to the arms 12a and 12b. The arms 12a and 12b can be removed from the connection portions of the links 18a and 18b, so that arm bodies 49a and 49b and arm ends 49c and 49d can be replaced with other arm bodies 49a and 49b of different lengths and other arm ends 49c and 49d of different lengths so as to correspond to a different outer diameter of another cylindrical structure 19.

In addition, the arms 12a and 12b of the holding mechanisms 13a and 13b respectively have lengths corresponding to the outer diameter of the cylindrical structure 19. The arms 12a and 12b respectively include: the arm bodies 49a and 49b disposed on the side of the device body 11 (on the proximal side); and the arm ends 49c and 49d that are disposed on distal ends of the arm bodies 49a and 49b so as to be separable therefrom. Thus, in order to hold the device body 11 on an outer circumferential surface of another cylindrical structure 19 of a different outer diameter, the arm ends 49c and 49d of the arms 12a and 12b are replaceable with other arm ends 49c and 49d having lengths different from those of the former arm ends 49c and 49d so as to correspond to the different outer diameter of the other cylindrical structure 19.

As shown in FIGS. 2(a) and 2(b), a distance sensor 28 is disposed on an outer surface of the device body 11 on a side opposed to a surrounding structure. The distance sensor 28 is formed of an ultrasonic distance sensor, and is capable of measuring a distance between the distance sensor 28 and a surrounding structure. FIG. 2(a) shows a state before an initial holding position at which the preventive maintenance/repair device 10 is held on the cylindrical structure 19 is not determined yet, and FIG. 2(b) shows a state after the initial holding position of the preventive maintenance/repair device 10 has been determined and the preventive maintenance/repair device 10 is held on the initial holding position.

As shown in FIGS. 3(a) and 3(b), the traveling and driving part 20 disposed on the device body 11 includes a traveling wheel 21 that is driven in rotation in contact with the outer circumferential surface of the cylindrical structure 19, and a motor 26 that drives the traveling wheel 21 in rotation. FIG. 3(a) is a front view for explaining the traveling and driving part 20, and FIG. 3(b) is a bottom view of the traveling and driving part 20. A shaft 25 is connected to the traveling wheel 21, and a gear 22 is connected to the shaft 25. The gear 22 is connected to an output shaft of the motor 26 via gears 23 and 24. Further, connected to the motor 26 are cables 27a and 27b for remotely operating the motor 26. The traveling and driving part 20 is removably mounted on the device body 11.

As shown in FIGS. 4(a), 4(b), 4(c), and 4(d), the maintenance/repair mechanism 16 includes an equipment 15 that maintains and repairs the cylindrical structure 19, and an equipment cylinder 30 that drives the equipment 15 in a longitudinal direction of the cylindrical body 19. FIG. 4(a) is a front view for explaining a state in which the equipment 15 of the maintenance/repair mechanism 16 is held at an upper position, FIG. 4(b) is a side view for explaining a state in which the equipment 15 of the maintenance/repair mechanism 16 is held at the upper position, FIG. 4(c) is a front view for explaining the equipment 15 of the maintenance/repair mechanism 16 is held at a lower position, and FIG. 4(d) is a side view for explaining the equipment 15 of the maintenance/repair mechanism 16 at the lower position.

As shown in FIGS. 4(a), 4(b), 4(c), and 4(d), a plate 29 is removably mounted on the arm 12b of the holding mechanism 13b. The plate 29 has an equipment cylinder 30 and a slide guide 31. The equipment 15 is mounted on the slide guide 31 via a plate 32b. Fixed via a plate 32a on a surface of the equipment 15 which is opposed to the surface on which the plate 32b is disposed is an L-shaped fitting 33 to be connected to an end of a shaft of the equipment cylinder 30.

As shown in FIGS. 4(a), 4(b), 4(c), and 4(d), the arm 12b is provided with a cutout 12c corresponding to the maintenance/repair mechanism 16. Although not shown, the other arm 12a, which is disposed on the side opposite to the arm 12b with respect to the cylindrical structure 19, is provided with the same cutout 12c. Thus, the maintenance/repair mechanism 16 can be mounted not only on the arm 12b but also on the arm 12a.

In FIGS. 4(a), 4(b), 4(c), and 4(d), although the cutout 12c of the arm 12b faces downward, the cutout 12c may be formed to face upward. Thus, in FIGS. 4(a), 4(b), 4(c), and 4(d), the maintenance/repair mechanism 16 can be mounted on the arm 12b to face downward or upward. Similarly, in FIGS. 4(a), 4(b), 4(c), and 4(d), the maintenance/repair mechanism 16 can be mounted on the arm 12a to face downward or upward.

The equipment 15 of the maintenance/repair mechanism 16 is formed of an ultrasonic flaw-detecting probe, such as a phased-array UT probe, which can ultrasonically detect a flaw such as a crack of the cylindrical structure 19 without contacting the cylindrical structure 19.

Alternatively, the equipment 15 of the maintenance/repair mechanism 16 may be a camera for a visual observation. Further, the equipment 15 of the maintenance/repair mechanism 16 may be a polishing jig.

As shown in FIG. 5, the device body 11 is equipped with an access device 34 that brings the device body 11 closer to the cylindrical structure 19 so as to attach the device body 11 to the outer circumferential surface of the cylindrical structure 19 and to detach therefrom the device body 11. In addition, connected to the access device 34 is an operation pole 46 via a connection part 45.

The access device 34 includes: an access-device holding part 35 engageable with the device body 11; and a rotating and driving part 36 interposed between the connection part 45 on the side of the operation pole 46 and the access-device holding part 35, the rotating and driving part 36 being capable of rotating the device body 11 and the access-device holding part 35 with respect to the connection part 45 and the operation pole 46.

The access-device holding part 35 includes a plurality of device-body side pins 35a to be inserted into a plurality of holes formed in the device body 11, holding pins 35b for holding the device-body side pins 35a, and holding cylinder 37 for pressing the holding pins 35b onto the device-body side pins 35a via fittings 35c.

The rotating and driving part 36 includes a frame 38 rotatably connected to the access-device holding part 35 through a pin 42, and a rotational cylinder 40. A fixed side of the rotational cylinder 40 is rotatably connected to the frame 38 through a pin 39, and an end of a shaft 43 is rotatably connected to a fixed side of the holding cylinder 37 through a pin 44. The frame 38 has the connection part 45 to which the operation pole 46 can be connected.

As shown in FIG. 6, the operation pole 46 is composed of an operation pole 46a and an operation pole 46b. The operation pole 46a is connected to the connection part 45 of the frame 38 (see, FIG. 5), and the operation pole 46a and the operation pole 46b are connected to each other.

Next, an operation of this embodiment as structured above is described. Given herein as an example to describe the process is a case where a pipe installed vertically in the reactor pressure vessel 1 is maintained and repaired.

How to fit the access device 34 on the device body 11 is described with reference to FIG. 5. At this time, the plurality of device-body side pins 35a of the access-device holding part 35 disposed on the access device 34 are firstly inserted into the plurality of holes formed in the device body 11. Then, the holding cylinders 37 of the rotating and driving part 36 are driven so as to press the holding pins 35b onto the device-body side pins 35a via the fittings 35c. Thus, the device body 11 can be held by the access device 34, without the device-body side pins 35a coming off from the holes formed in the device body 11.

Next, how to fit the operation pole 46a on the connection part 45 of the frame 38 (see, FIG. 5) disposed on the access device 34 is described with reference to FIG. 6. At this time, one end of the operation pole 46a is connected to the connection part 45 of the frame 38 of the rotating and driving part 36 of the access device 34. Then, the operation pole 46b is connected to the other end of the operation pole 46a.

Thereafter, the device body 11 hanging from the operation pole 46 composed of the operation poles 46a and 46b is sent into the reactor pressure vessel 1, and is brought closer to the cylindrical structure 19. At this time, as shown in FIG. 5, the rotation cylinder 40 of the rotating and driving part 36 of the access device 34 is driven so as to contract the shaft 43 of the rotation cylinder 40. Thus, the device body 11 and the access-device holding part 35 are rotated with respect to the operation pole 46*a*, so that the device body 11 is oriented in substantially the same direction as the longitudinal direction of the operation poles 46*a* and 46*b*.

Then, as shown in FIG. 6, the preventive maintenance/repair device 10, which is held by the operation poles 46*a* and 46*b* connected to the access device 34, is sent in the hanging manner via the access device 34. After that, the preventive maintenance/repair device 10 is sent into the reactor pressure vessel 1 through the lateral side of the CS pipe 48, and is brought closer to a target region of the cylindrical structure 19.

Then, as shown in FIG. 5, the rotation cylinder 40 is driven so as to extend the shaft 43 of the rotation cylinder 40. Thus, the device body 11 and the access-device holding part 35 are rotated with respect to the operation pole 46*a*, so that the device body 11 is oriented in a direction substantially perpendicular to the longitudinal direction of the operation poles 46*a* and 46*b*.

Then, the device body 11 is held by the holding mechanism 13 on the outer circumferential surface of the cylindrical structure 19. At this time, as shown in FIG. 1(*a*), the traveling wheel 21 of the traveling and driving part 20 is in contact with the outer circumferential surface of the cylindrical structure 19. In addition, by driving the arm cylinder 17*a*, 17*b*, 17*c*, and 17*d* of the holding mechanisms 13*a* and 13*b*, the guide rollers 14*a* and 14*b* disposed on the distal ends of the arms 12*a* and 12*b* are pressed onto the outer circumferential surface of the cylindrical structure 19 via the links 18*a* and 18*b* and the arms 12*a* and 12*b*. Thus, the preventive maintenance/repair device 10 is held on the outer circumferential surface of the cylindrical structure 19.

In a case in which another cylindrical structure 19 of a different outer diameter is maintained and repaired, the arm ends 49*c* and 49*d* of the arms 12*a* and 12*b* are previously replaced with other arm ends 49*c* and 49*d* so that the arms 12*a* and 12*b* have the lengths corresponding to the outer diameter of this cylindrical structure 19. Thus, the preventive maintenance/repair device 10 can be securely held on the cylindrical structure 19 of a given outer diameter.

As described above, after the device body 11 has been held on the cylindrical structure 19 by the arms 12*a* and 12*b* of the holding mechanism 13, the access device 34 is removed from the device body 11. At this time, the holding cylinder 37 of the access-device holding part 35 is driven so as to move the holding pins 35*b* via the fittings 35*c* from the device-body side pins 35*a* to a side opposed to the device-body side pins 35*a*. Then, the access-device holding part 35 hanging from the operation poles 46*a* and 46*b* is moved upward of the reactor pressure vessel 11. Thus, the plurality of device-body side pins 35*a* can be drawn out from the plurality of holes formed in the device body 11. Thereafter, the access device 34 is moved further upward of the reactor pressure vessel 1 in the hanging manner by means of the operation poles 46*a* and 46*b*, and the access device 34 is withdrawn.

Then, the preventive maintenance/repair device 10 is circumferentially moved along the outer circumferential surface of the cylindrical structure 19. In this case, a drive command is firstly given from a remote location to the motor 26 of the traveling and driving part 20 through the cables 27*a* and 27*b*. At this time, the motor 26 is driven, so that the rotational force of the motor 26 is transmitted to the shaft 25 via the gear 24, the gear 23, and the gear 22. The rotational force of the shaft 25 is transmitted to the traveling wheel 11 connected to the shaft 25, so that the traveling wheel 11 is drive in rotation. Thus, the preventive maintenance/repair device 10 can be circumferentially moved along the outer circumferential surface of the cylindrical structure 19.

When the preventive maintenance/repair device 10 is circumferentially moved along the outer circumferential surface of the cylindrical structure 19, the guide rollers 14*a* and 14*b* disposed on the distal ends of the arms 12*a* and 12*b* of the holding mechanisms 13*a* and 13*b* are rotated in accordance with the movement of the preventive maintenance/repair device 10. Also at this time, as described above, the guide rollers 14*a* and 14*b* are pressed onto the outer circumferential surface of the cylindrical structure 19 by the arm cylinders 17*a*, 17*b*, 17*c*, and 17*d* of the holding mechanisms 13*a* and 13*b*. Thus, the preventive maintenance/repair device 10 can be smoothly, circumferentially moved along the outer circumferential surface of the cylindrical structure 19, while the preventive maintenance/repair device 10 is being held on the outer circumferential surface of the cylindrical structure 19. As a result, the equipment 15 of the maintenance/repair mechanism 16 can be smoothly moved to a desired circumferential position along the outer circumferential surface of the cylindrical structure 19.

The traveling and driving part 20 can be easily mounted on and removed from the device body 11. Thus, if the traveling and driving part 20 is broken for some reason or another, the whole preventive maintenance/repair device 10 is drawn upward, and the broken traveling and driving part 20 can be replaced with another normal traveling and driving part 20, which has been prepared beforehand, for a short period of time.

Then, as shown in FIGS. 2(*a*) and 2(*b*), there is determined an initial position at which the preventive maintenance/repair device 10 is held on the outer circumferential surface of the cylindrical structure 19. The reason for determining the initial position is as follows. In order to hold the preventive maintenance/repair device 10 on the cylindrical structure 19, since the space of the annulus part surrounding the cylindrical structure 19 is narrow, it is necessary to bring the preventive maintenance/repair device 10 closer to a target region of the cylindrical structure 19 from a direction in which the preventive maintenance/repair device 10 does not interfere with a structure surrounding the cylindrical structure 19. Thus, the direction in which the preventive maintenance/repair device 10 is held varies for each time, i.e., the direction in which the preventive maintenance/repair device 10 is held is not constant.

During the operation, there is a possibility that the preventive maintenance/repair device 10 is not held on a target region of the cylindrical structure 19 so as to be detached from the target region for some reason or another. In this case, the equipment 15 of the maintenance/repair mechanism 16 is not appropriately opposed to the outer circumferential surface of the cylindrical structure 19. Under this state, the target region of the cylindrical structure 19 cannot be precisely maintained and repaired. It is difficult to exactly return the preventive maintenance/repair device 10 to the original target region from which the preventive maintenance/repair device 10 has been detached. Even when the preventive maintenance/repair device 10 is returned to a region near the original target region from which the preventive maintenance/repair device 10 has been detached so as to continue the maintenance/repair operation, there may remain some region that could not be maintained and operated, between the original target region from which the preventive maintenance/repair device 10 has been detached and the region to which the preventive maintenance/repair device 10 is returned.

In order to avoid this situation, in this embodiment, there is determined an initial holding position at which the preventive maintenance/repair device 10 is held on the outer circumferential surface of the cylindrical structure 19. At this time, there is used the distance sensor 28 which is disposed on the outer surface of the device body 11 on a side opposed to the surrounding structure, which is shown in FIGS. 2(a) and 2(b). At first, by driving the motor 17 of the traveling and driving part 20, the preventive maintenance/repair device 10 is circumferentially moved along the outer circumferential surface of the cylindrical structure 19, and a distance between the distance sensor 28 and the surrounding structure is simultaneously measured. Then, there is obtained a position of the preventive maintenance/repair device 10 at which the measured distance is shortest. The thus obtained position is recorded, and the position is determined as an original point of the initial holding position of the preventive maintenance/repair device 10.

Below the guide roller 14a or 14b of the holding mechanism 13a or 13b, there are disposed a rotational sensor (not shown) that measures an angle of a holding position of the preventive maintenance/repair device 10, and a measurement wheel (not shown) that rotates the rotational sensor. With the use of the rotational sensor, an angle of the holding position of the preventive maintenance/repair device 10 is measured. Thus, there can be obtained an angle between the aforementioned original point and the holding position of the preventive maintenance/repair device 10 at which the preventive maintenance/repair device 10 has been circumferentially moved along the outer circumferential surface of the cylindrical structure 19 from the original point.

In this manner, an initial holding position of the preventive maintenance/repair device 10 is determined. Thus, even when the preventive maintenance/repair device 10 is detached from the target region of the cylindrical structure 19 during the maintaining and repairing operation, it is possible to specify the position at which the preventive maintenance/repair device 10 has been held before the preventive maintenance/repair device 10 is detached therefrom. Accordingly, the maintaining and repairing operation can be reliably performed both at the holding position in the target region from which the preventive maintenance/repair device 10 has been detached and at the holding position in the target region to which the preventive maintenance/repair device 10 is returned.

Then, the equipment 15 of the maintenance/repair mechanism 16 is moved by the equipment cylinder 30 in the longitudinal direction of the cylindrical structure 19. At this time, the shaft of the equipment cylinder 30 for moving the equipment 15 in the longitudinal direction of the cylindrical structure 19 is driven so as to be expanded and contracted. Since the equipment 15 is slidably disposed in the longitudinal direction of the cylindrical structure 19 with respect to the fixed plate 29 by the slide guide 31, the expansion and contraction drive of the shaft of the equipment cylinder 30 is transmitted to the equipment 15 via the L-shaped fitting 33 and the plate 32a, so that the equipment 15 is slid in the longitudinal direction of the cylindrical structure 19. Thus, the equipment 15 can be precisely moved in the longitudinal direction of the cylindrical structure 19 toward a target region of the cylindrical structure 19.

Further, the plate 29 of the maintenance/repair mechanism 16 can be fixed not only to the arm 12b but also to the arm 12a. Furthermore, the maintenance/repair mechanism 16 disposed to face downward in FIGS. 4(a), 4(b), 4(c), and 4(d) may be disposed to face upward in FIGS. 4(a), 4(b), 4(c), and 4(d). Thus, when a working space in which the maintaining and repairing operation is performed by the preventive maintenance/repair device 10 is restricted, by changing the position and the direction of the maintenance/repair mechanism 16, the maintaining and repairing operation is performed over a wide range as much as possible by effectively using the working space.

Then, by driving the motor 17 of the traveling and driving part 20, the preventive maintenance/repair device 10 is circumferentially moved along the outer circumferential surface of the cylindrical structure 19. Thus, the equipment 15 can be circumferentially moved along the outer circumferential surface of the cylindrical structure 19. Accordingly, the cylindrical structure 19 can be maintained and repaired by the equipment 15 over all the outer circumferential surface of the cylindrical structure 19.

When the equipment 15 of the maintenance/repair mechanism 16 shown in FIGS. 4(a), 4(b), 4(c), and 4(d) is formed of an ultrasonic flaw-detecting probe, a target region of the cylindrical structure 19 can be ultrasonically detected. Thus, whether there is a crack or not in a welding line of the cylindrical structure 19 can be checked.

Alternatively, the equipment 15 of the maintenance/repair mechanism 16 is formed of a camera for a visual observation, the appearance of the outer circumferential surface of the cylindrical structure 19 can be visually checked.

In the above embodiment, there has been described the maintaining and repairing operation which is performed when the reactor pressure vessel 1 is filled with water. However, the reactor pressure vessel 1 is not filled with water but with air, the equipment 15 of the maintenance/repair mechanism 16 may be replaced with another equipment so as to perform another maintaining and repairing operation. Namely, when the equipment 15 is formed of a polishing jig, the outer circumferential surface of the cylindrical structure 19 can be repaired. Alternatively, when the equipment 15 is formed of a cleaning equipment such as a brush or a water-cleaning nozzle, the outer circumferential surface of the cylindrical structure 19 can be cleaned. Alternatively, when the equipment 15 is formed of a maintenance equipment such as a water-jet peening head or a laser peening head, the cylindrical structure 19 can be maintained. Alternatively, when the equipment 15 is formed of a welding head or a grinding jig, the outer circumferential surface of the cylindrical structure 19 can be repaired.

According to this embodiment, the preventive maintenance/repair device 10 can be securely held on the outer circumferential surface of the cylindrical structure 19 installed in the reactor pressure vessel 1. In addition, the preventive maintenance/repair device 10 can be circumferentially moved on the outer circumferential surface of the cylindrical structure 19. Thus, the preventive maintenance/repair device 10 can be precisely moved to a target region of the outer circumferential surface of the cylindrical structure 19, so that the outer circumferential surface of the cylindrical structure 19 can be maintained and repaired.

Second Embodiment

Figure 7:
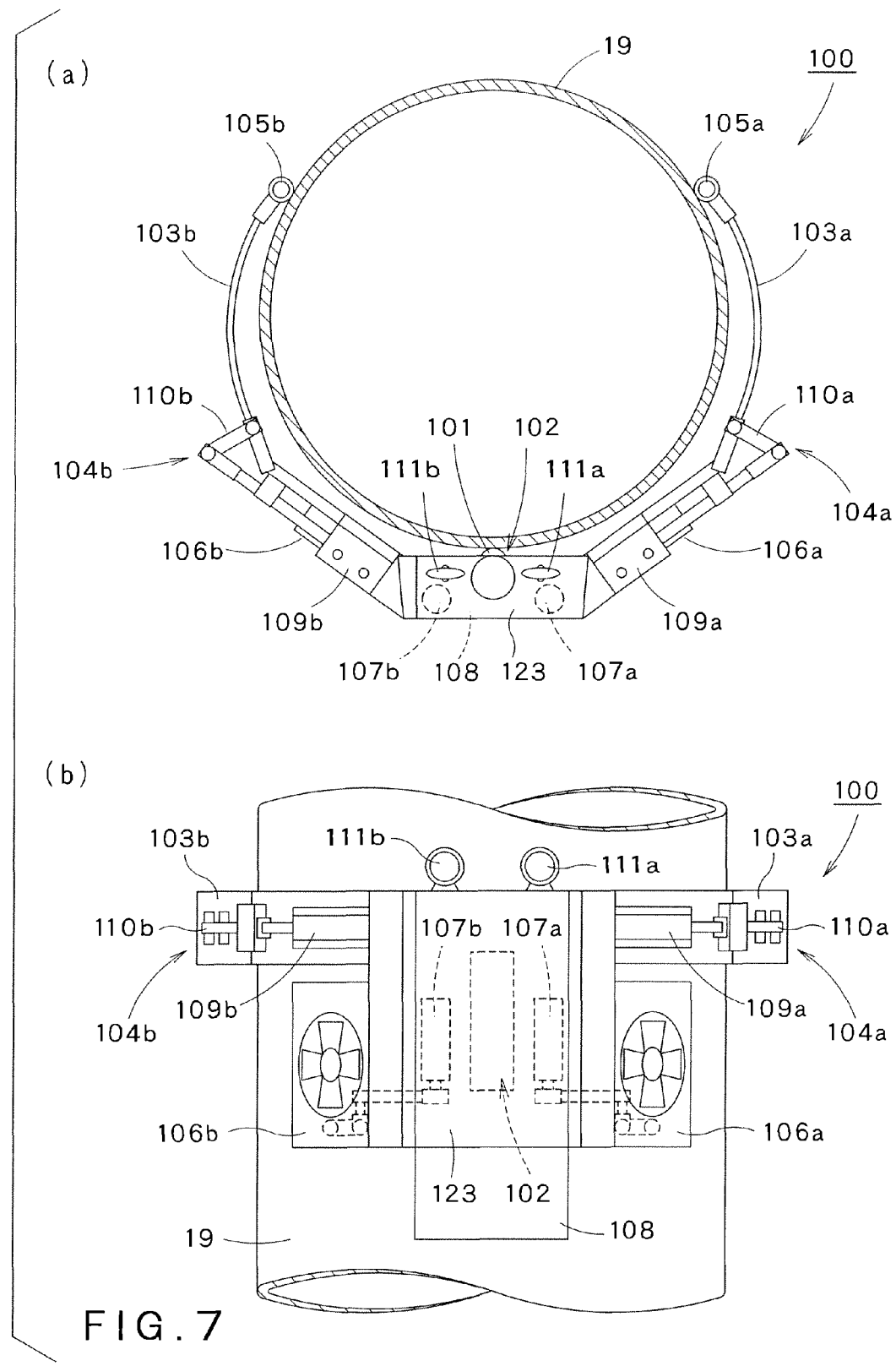
FIG. 7 is an overall structural view for explaining a preventive maintenance/repair device in a second embodiment of the present invention.
Figure 8:
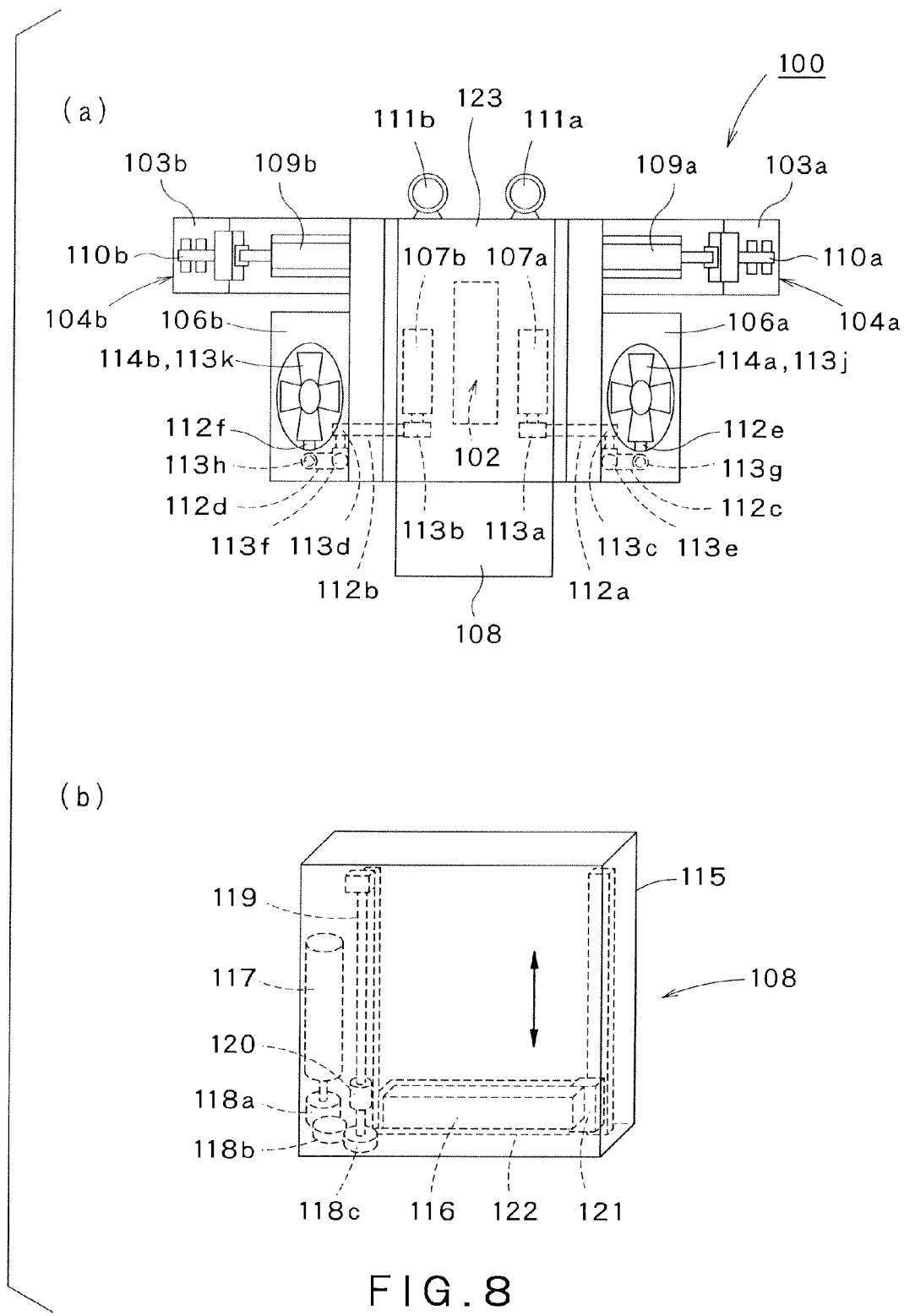
FIG. 8 is a structural view for explaining a thruster driving part in the second embodiment of the present invention.
Figure 9:
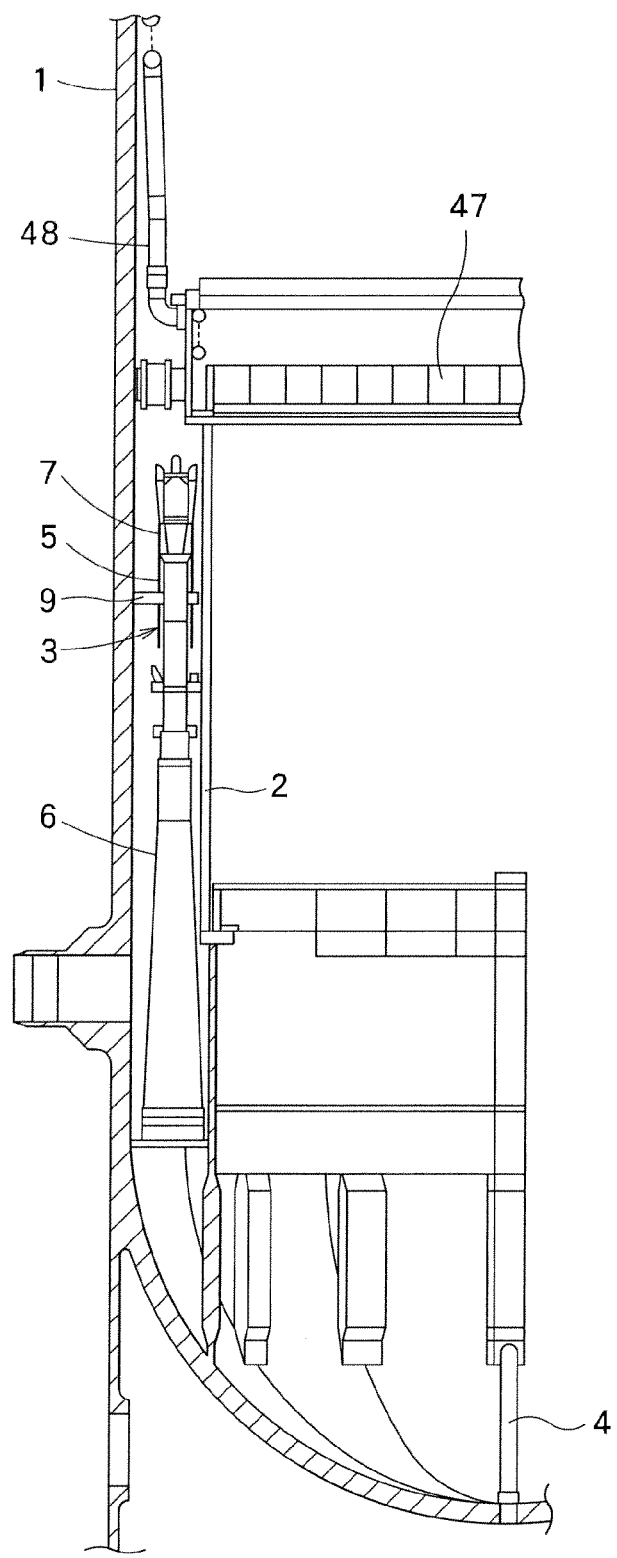
FIG. 9 is a structural view for explaining an inside of a reactor pressure vessel in a boiling water reactor.
Figure 10:
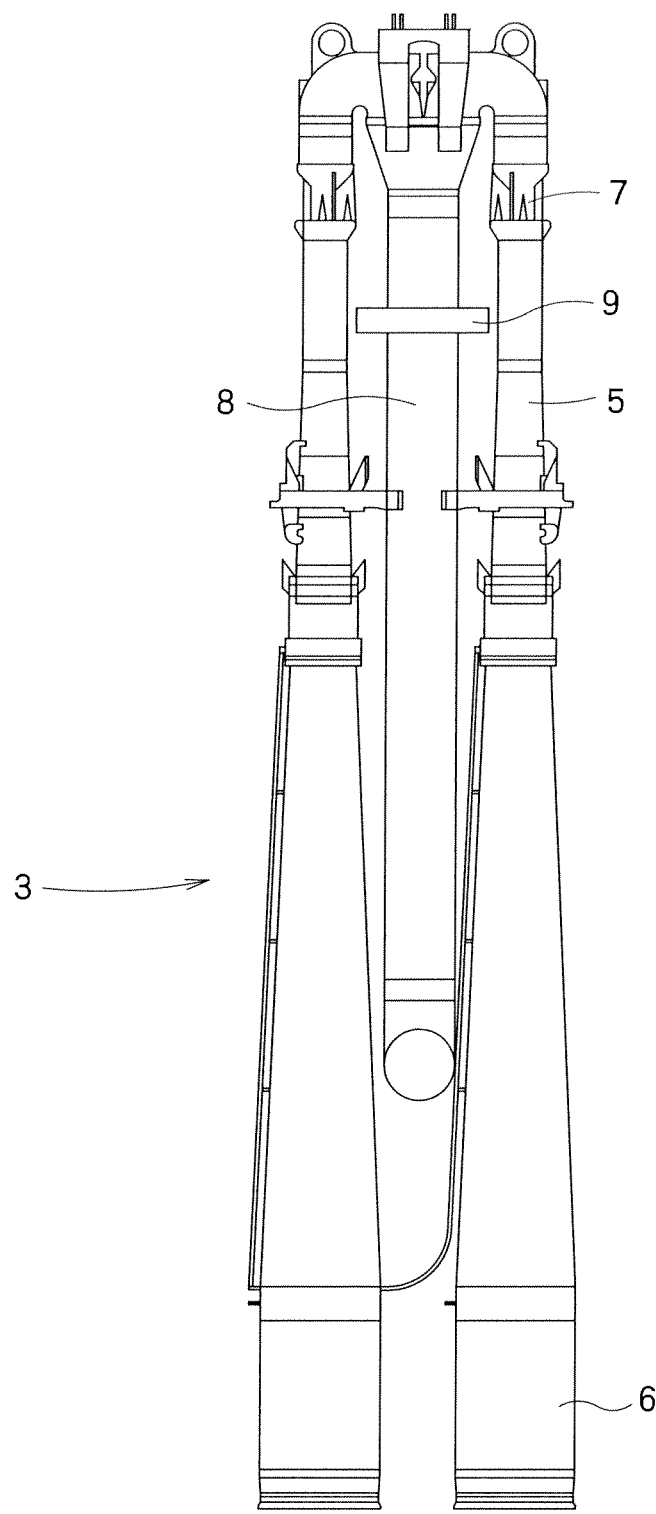
FIG. 10 is a structural view showing a jet pump in the boiling water reactor.

Next, a preventive maintenance/repair device in a second embodiment of the present invention is described with reference to FIGS. 7 and 8. FIGS. 7(a) and 7(b) are overall structural views for explaining the preventive maintenance/repair device. FIGS. 8(a) and 8(b) are structural views for explaining a thruster driving part.

The second embodiment shown in FIGS. 7(a) and 7(b) and FIGS. 8(a) and 8(b) is embodied by applying a thruster driving part to the first embodiment, and other structures of the second embodiment are substantially the same as those of the first embodiment shown in FIGS. 1 to 6.

In this embodiment, the parts and elements identical to those of the first embodiment are shown by the same reference numbers, and detailed description thereof is omitted. FIG. 7(a) is a plan view of the overall structure for explaining the preventive maintenance/repair device 100, and FIG. 7(b) is a front view of the overall structure for explaining the preventive maintenance/repair device 100. FIG. 8(a) is a structural view for explaining the thruster driving part, and FIG. 8(b) is a structural view for explaining a maintenance/repair mechanism 108. As shown in FIGS. 7(a) and 7(b), there are disposed: a device body 123; a pair of holding mechanisms 104a and 104b connected to the device body 123, the holding mechanisms 104 and 104b being capable of holding the device body 123 on an outer circumferential surface of a cylindrical structure 19; and a traveling and driving part 102 disposed on the device body 123, the traveling and driving part 102 being capable of circumferentially moving along the outer circumferential surface of the cylindrical structure 19. Disposed on a lower part of the device body 123 is a maintenance/repair mechanism 108 that maintains and repairs the cylindrical structure 19. In addition, disposed on opposed side surfaces of the device body 123 are a pair of thruster driving parts 106a and 106b that moves the device body 123 in water.

The holding mechanisms 104a and 104b respectively include: a pair of arms 103a and 103b each having a shape along the outer circumferential surface of the cylindrical structure 19; and guide rollers 105a and 105b disposed on distal ends of the pair of arms 103a and 103b. Respectively connected to the pair of arms 103a and 103b are arm cylinders 109a and 109b for driving the arms 103a and the 103b pneumatically or hydraulically. The arm 103a and the arm cylinder 109a, and the arm 103b and the arm cylinder 109b, are respectively connected by links 110a and 110b that respectively transmit driving forces of the arm cylinders 109a and 109b to the arms 103a and 103b.

As shown in FIGS. 7(a) and 7(b), the traveling and driving part 102 has a traveling wheel 101 which is driven in rotation, while being in contact with the outer circumferential surface of the cylindrical structure 19. Other structures are substantially the same as those of the first embodiment shown in FIGS. 3(a) and 3(b). The traveling and driving part 102 is removably mounted on the device body 123.

As shown in FIG. 8(a), the thruster driving parts 106a and 106b respectively include thrusters 114a and 114b, and motors 107a and 107b for driving the thrusters 114a and 114b. Pulleys 113a and 113b are connected to output shafts of the motors 107a and 107b, and pulleys 113j and 113k are connected to rotational shafts of the thrusters 114a and 114b. Intermediate pulleys 113c and 113d are disposed on positions near the pulleys 113a and 113b. Intermediate pulleys 113e and 113f are disposed on positions nearer the thrusters 114a and 114b to the intermediate pulleys 113c and 113d. Further, intermediate pulleys 113g and 113h are disposed on positions nearer to the thrusters 114a and 114b to the intermediate pulleys 113e and 113f.

As shown in FIG. 8(a), the pulleys 113a and 113b on the side of the motors 107a and 107b and the intermediate pulleys 113c and 113d are connected to each other by belts 112a and 112b. The intermediate pulleys 113e and 113f and the intermediate pulleys 113g and 113h are connected to each other by belts 112c and 112d. The intermediate pulleys 113g and 113h and the pulleys 113j and 113k on the side of the thrusters are connected to each other by belts 112e and 112f.

As shown in FIG. 8(b), the maintenance/repair mechanism 108 includes a housing 115, an equipment 116 that maintains and repairs the cylindrical structure 19, and a motor 117 that drives the equipment 116 in a longitudinal direction of the cylindrical structure 19. A gear 118a is connected to an output shaft of the motor 117. Connected to the gear 118a is a ball screw 119 via a gear 118b and a gear 118c. A nut 120 is engaged with the ball screw 119, and the nut 120 is connected to one end of a container case 122 for containing the equipment 116. Connected to the other end of the container case 122 is a slide guide 121 that makes slidable the container case 122 with respect to the housing 115. The maintenance/repair mechanism 108 is removably mounted on the device body 123.

As shown in FIG. 8(b), the equipment 116 of the maintenance/repair mechanism 108 is formed of an ultrasonic flaw-detecting probe, such as a phased-array UT probe, which can ultrasonically detect a flaw such as a crack of the cylindrical structure 19 without contacting the cylindrical structure 19.

In order to neutrally float the preventive maintenance/repair device 100 so as to move the preventive maintenance/repair device 100 in water by thrust force of the thruster driving parts 106a and 106b, a buoyant member (not shown) is located in one of the device body 123 and the maintenance/repair mechanism 108.

As shown in FIGS. 7(a) and 7(b), arranged on an upper surface of the device body 123 are pendant fittings 111a 111b to which a rope and the like is fitted when the preventive maintenance/repair device 100 is lowered from the upper part of the reactor pressure vessel 1 in a hanging manner.

According to this embodiment, as shown in FIG. 8(a), when the preventive maintenance/repair device 100 is moved in the water, the motors 107a and 107b of the thruster driving parts 106a and 106b are driven. The rotations of the motors 107a and 107b are transmitted to the intermediate pulleys 113c and 113d through the pulleys 113a and 113b and the belts 112a and 112b. Then, the rotations are transmitted to the intermediate pulleys 113g and 113h through the intermediate pulleys 113e and 113f connected to the intermediate pulleys 113c and 113d and through the belts 112c and 112d. The rotations are further transmitted to the pulleys 113j and 113k though the belts 112e and 112f connected to the intermediate pulleys 113g and 113h. Thus, the rotations of the motors 107a and the 107b are transmitted to the thrusters 114a and 114b, so that the thrusters 114a and the 114b are rotated.

Since the buoyant member (not shown) is located in one of the device body 123 and the maintenance/repair mechanism 108, the preventive maintenance/repair device 100 can neutrally float.

Thus, the preventive maintenance/repair device 100 can be moved in the water by the thrust force of the thruster driving parts 106a and 106b. As a result, the preventive maintenance/repair device 100 can be moved in the water, without the use of an access device that attaches/detaches the preventive maintenance/repair device 100 to/from the cylindrical structure 19.

As shown in FIGS. 7(a) and 7(b), the traveling wheel 101 of the traveling and driving part 102 is in contact with the outer circumferential surface of the cylindrical structure 19. In addition, by driving the arm cylinders 109a and 109b of the holding mechanisms 104a and 104b, the guide rollers 105a and 105b disposed on the distal ends of the arms 103a and 103b are pressed onto the outer circumferential surface of the cylindrical structure 19 via the links 110a and 110b and the arms 103a and 103b. Therefore, the preventive maintenance/ repair device 100 can be held on the outer circumferential surface of the cylindrical structure 19.

As shown in FIG. 8(b), when the equipment 116 of the maintenance/repair mechanism 108 is moved in the longitudinal direction of the cylindrical structure 19, the motor 117 of the maintenance/repair mechanism 108 is driven. The equipment 116 is slidably disposed in the longitudinal direction of the cylindrical structure 19 with respect to the fixed housing 115 by the slide guide 121. The rotational drive of the motor 117 is transmitted to the ball screw 119 via the gears 118a, 118b, and 118c, and the rotational motion of the ball screw 119 is converted into a vertically linear motion by the nut 120. Thus, the equipment 116 connected to the nut 120 is slid in the longitudinal direction of the cylindrical structure 19. Accordingly, the equipment 116 can be precisely moved toward a target region of the cylindrical structure 19 in the longitudinal direction of the cylindrical structure 19.

The traveling and driving mechanism 108 can be easily mounted on and removed from the device body 123. Thus, if the maintenance/repair mechanism 108 is broken for some reason or another, the whole preventive maintenance/repair device 100 is drawn upward, and the broken maintenance/repair mechanism 108 can be replaced with another normal maintenance/repair mechanism 108, which has been prepared beforehand, for a short period of time.

As shown in FIGS. 7(a) and 7(b), when the preventive maintenance/repair device 100 is circumferentially moved along the outer circumferential surface of the cylindrical structure 19, the motor (not shown) of the traveling and driving part 102 is driven so that the traveling wheel 101 is driven in rotation. When the preventive maintenance/repair device 100 is circumferentially moved along the outer circumferential surface of the cylindrical structure 19, the guide rollers 105a and 105b disposed on the distal ends of the arms 103a and 103b of the holding mechanism 104a and 104b are rotated in accordance with the movement of the preventive maintenance/repair device 100. Also at this time, as described above, the guide rollers 105a and the 105b are pressed onto the outer circumferential surface of the cylindrical structure 19 by the arm cylinders 109a and 109b of the holding mechanisms 104a and 104b. Thus, the preventive maintenance/repair device 100 can be smoothly, circumferentially moved along the outer circumferential surface of the cylindrical structure 19, while the preventive maintenance/repair device 100 is being held on the outer circumferential surface of the cylindrical structure 19. Accordingly, the equipment 116 of the maintenance/repair mechanism 108 can be smoothly moved to a desired circumferential position along the outer circumferential surface of the cylindrical structure 19. As a result, the cylindrical structure 19 can be maintained and repaired over all the circumferential surface thereof by the equipment 116.

The traveling and driving part 102 can be easily mounted on and removed from the device body 123. Thus, if the traveling and driving part 102 is broken for some reason or another, the whole preventive maintenance/repair device 100 is drawn upward, and the broken traveling and driving part 102 can be replaced with another normal traveling and driving part 102, which has been prepared beforehand, for a short period of time.

When the equipment 116 of the maintenance/repair mechanism 108 shown in FIG. 8(b) is formed of an ultrasonic flaw-detecting probe, a target region of the cylindrical structure 19 can be ultrasonically detected. Thus, whether there is a crack or not in a welding line of the cylindrical structure 19 can be checked. In addition, various maintaining and repairing operations are possible by using other equipments 116 that are similar to the equipments in the first embodiment.

Due to the provision of the pendent fittings 111a and 111b on the upper surface of the device body 123, the preventive maintenance/repair device 100 can be lowered from the upper part of the reactor pressure vessel 1 in a hanging manner, by connecting a rope or the like to the pendent fittings 111a and 111b.

According to this embodiment, the preventive maintenance/repair device 100 can be securely held on the outer circumferential surface of the cylindrical structure 19 installed in the reactor pressure vessel 1. In addition, the preventive maintenance/repair device 100 can be circumferentially moved on the outer circumferential surface of the cylindrical structure 19. In addition, the preventive maintenance/repair device 100 can be moved in water. Thus, the preventive maintenance/repair device 100 can be precisely moved to a target region of the outer circumferential surface of the cylindrical structure 19, so that the outer circumferential surface of the cylindrical structure 19 can be maintained and repaired.

The invention claimed is:

1. A preventive maintenance/repair device for use in maintaining and repairing a cylindrical structure of a cylindrical shape among reactor internal structures installed in a reactor pressure vessel, the preventive maintenance/repair device comprising:
　　a device body;
　　a holding mechanism connected to the device body, the holding mechanism being configured to hold the device body on an outer circumferential surface of the cylindrical structure;
　　a traveling and driving part disposed on the device body, the traveling and driving part being configured to be circumferentially movable along the outer circumferential surface of the cylindrical structure; and
　　a maintenance/repair mechanism disposed on the holding mechanism, the maintenance/repair mechanism being configured to maintain and repair the cylindrical structure,
　　wherein the cylindrical structure is a jet pump,
　　the device body is provided with an access device configured to bring the device body to the cylindrical structure and to detachably hold the device body,
　　the access device includes:
　　　　an access-device holding part engageable with the device body and holding the device body;
　　　　an operation pole extending to an operation floor; and
　　　　a rotating and driving part interposed between the access-device holding part and the operation pole, the rotating and driving part being configured to rotate the access-device holding part with respect to the operation pole around an axis disposed substantially perpendicular to a longitudinal axis of the cylindrical structure, and
　　the access device is configured to hold the device body in substantially a same direction as a longitudinal axis of the operation pole or a direction substantially perpendicular to the longitudinal axis of the operation pole.

2. The preventive maintenance/repair device according to claim 1, wherein
　　the holding mechanism includes: a pair of arms each having a shape along the outer circumferential surface of the cylindrical structure; guide rollers respectively disposed on distal ends of the pair of arms; arm cylinders configured to respectively drive the pair of arms; and links connected between the arms and the arm cylinders, the links being configured to transmit drives of the arm cylinders to the arms.

3. The preventive maintenance/repair device according to claim 2, wherein
each of the arms of the holding mechanism is separable into a proximal arm body and a distal arm end, and
in order to hold the device body on an outer circumferential surface of another cylindrical structure of a different outer diameter, the arm end is configured to be replaced with another arm end of a different length with respect to the arm body.

4. The preventive maintenance/repair device according to claim 2, wherein
each of the arms of the holding mechanism is separable into a proximal arm body and a distal arm end, and
in order to hold the device body on an outer circumferential surface of another cylindrical structure of a different outer diameter, the arm body is configured to be replaced with another arm body of a different length with respect to the device body.

5. The preventive maintenance/repair device according to claim 1, wherein
a distance sensor is disposed on an outer surface of the device body on a side opposed to a surrounding structure.

6. The preventive maintenance/repair device according to claim 1, wherein
the maintenance/repair mechanism includes an equipment configured to maintain and repair the cylindrical structure, and an equipment cylinder configured to drive the equipment in a direction parallel to the longitudinal axis of the cylindrical structure.

7. The preventive maintenance/repair device according to claim 1, wherein the rotating and driving part comprises a frame rotatably connected to the access-device holding part and a rotational cylinder, the rotational cylinder having a shaft configured to expand and contract such that the access-device holding part rotates with respect to the operation pole around the axis disposed substantially perpendicular to the longitudinal axis of the cylindrical structure.

8. A preventive maintenance/repair method using a preventive maintenance/repair device for use in maintaining and repairing a cylindrical structure of a cylindrical shape among reactor internal structures installed in a reactor pressure vessel, the preventive maintenance/repair device comprising:
a device body;
a holding mechanism connected to the device body, the holding mechanism being configured to hold the device body on an outer circumferential surface of the cylindrical structure;
a traveling and driving part disposed on the device body, the traveling and driving part being configured to be circumferentially movable along the outer circumferential surface of the cylindrical structure; and
a maintenance/repair mechanism disposed on the holding mechanism, the maintenance/repair mechanism being configured to maintain and repair the cylindrical structure;
wherein the device body is provided with an access device configured to bring the device body closer to the cylindrical structure so as to attach the device body to the outer circumferential surface of the cylindrical structure and to detach therefrom the device body,
an operation pole is connected to the access device, and the access device includes a rotating and driving part,
the preventive maintenance/repair method comprising the steps of:
mounting the access device and the operation pole on the device body;
sending the device body into the reactor pressure vessel in a hanging manner through the operation pole and bringing the device body closer to the cylindrical structure using the rotating and driving part, the rotating and driving part being configured to rotate the access device with respect to the operation pole around an axis disposed substantially perpendicular to a longitudinal axis of the cylindrical structure;
holding the device body on the outer circumferential surface of the cylindrical structure by the holding mechanism;
removing the access device from the device body, after the device body has been held on the cylindrical structure by the holding mechanism; and
performing a maintenance/repair operation to the cylindrical structure by the maintenance/repair mechanism.

9. The preventive maintenance/repair method according to claim 8, wherein the rotating and driving part comprises a frame rotatably connected to an access-device holding part of the access device and a rotational cylinder, and bringing the device body closer to the cylindrical structure using the rotating and driving part comprises expanding and contracting a shaft of the rotational cylinder such that the access device rotates with respect to the operation pole around the axis disposed substantially perpendicular to the longitudinal axis of the cylindrical structure.

10. An access device for a preventive maintenance/repair device for use in maintaining and repairing a jet pump of a cylindrical shape among reactor internal structures installed in a reactor pressure vessel, the access device being configured to bring the preventive maintenance/repair device to the jet pump and to detachably hold the preventive maintenance/repair device,
the access device comprising:
an access-device holding part engageable with the preventive maintenance/repair device and holding said preventive maintenance/repair device;
an operation pole extending to an operation floor; and
a rotating and driving part interposed between the access-device holding part and the operation pole, the rotating and driving part being configured to rotate the access-device holding part with respect to the operation pole around an axis disposed substantially perpendicular to a longitudinal axis of the cylindrical structure, and
wherein the access device is configured to hold the preventive maintenance/repair device in substantially a same direction as a longitudinal axis of the operation pole or a direction substantially perpendicular to the longitudinal axis of the operation pole.

11. The access device according to claim 10, wherein the rotating and driving part comprises a frame rotatably connected to the access-device holding part and a rotational cylinder, the rotational cylinder having a shaft configured to expand and contract such that the access-device holding part rotates with respect to the operation pole around the axis disposed substantially perpendicular to the longitudinal axis of the cylindrical structure.

* * * * *